(12) United States Patent
Escarpit

(10) Patent No.: US 8,579,567 B2
(45) Date of Patent: Nov. 12, 2013

(54) DEVICE FOR BLIND FIXATION

(75) Inventor: Olivier Escarpit, Fontenilles (FR)

(73) Assignee: Airbus Operations S.A.S., Toulouse (FR)

( * ) Notice: Subject to any disclaimer, the term of this patent is extended or adjusted under 35 U.S.C. 154(b) by 305 days.

(21) Appl. No.: 13/126,963

(22) PCT Filed: Nov. 3, 2009

(86) PCT No.: PCT/FR2009/052126
§ 371 (c)(1),
(2), (4) Date: Apr. 29, 2011

(87) PCT Pub. No.: WO2010/061093
PCT Pub. Date: Jun. 3, 2010

(65) Prior Publication Data
US 2011/0206480 A1      Aug. 25, 2011

(30) Foreign Application Priority Data
Nov. 3, 2008   (FR) ..................... 08 06124

(51) Int. Cl.
*F16B 13/04*   (2006.01)

(52) U.S. Cl.
USPC ............... 411/43; 411/24; 411/34; 411/39

(58) Field of Classification Search
USPC ....... 411/21, 22, 24, 34, 39, 41, 43, 56, 60.1, 411/60.2, 69, 70
See application file for complete search history.

(56) References Cited

U.S. PATENT DOCUMENTS

| | | | | |
|---|---|---|---|---|
| 2,765,699 A * | 10/1956 | La Torre | ......................... | 411/43 |
| 2,795,989 A * | 6/1957 | Koenig | ......................... | 411/54 |
| 2,887,003 A * | 5/1959 | Brilmyer | ......................... | 411/34 |
| 3,129,630 A * | 4/1964 | Wing et al. | ..................... | 411/43 |
| 3,262,353 A * | 7/1966 | Waeltz et al. | ................... | 411/39 |
| 3,292,482 A * | 12/1966 | Fry et al. | ......................... | 411/43 |
| 3,302,510 A * | 2/1967 | Gapp | ............................. | 411/43 |
| 3,369,289 A * | 2/1968 | Gapp | ............................. | 29/512 |
| 4,089,249 A | 5/1978 | Binns | | |
| 4,370,081 A * | 1/1983 | Briles | ............................ | 411/43 |
| 4,408,937 A * | 10/1983 | Hainke et al. | ................... | 411/42 |

(Continued)

FOREIGN PATENT DOCUMENTS

DE     34 48 553     4/1999
FR     2 555 261     5/1985

OTHER PUBLICATIONS

International Search Report issued Mar. 3, 2010 in PCT/FR09/52126 filed Nov. 3, 2009.

*Primary Examiner* — Roberta Delisle
(74) *Attorney, Agent, or Firm* — Oblon, Spivak, McClelland, Maier & Neustadt, L.L.P.

(57) ABSTRACT

A blind fixation device for attaching an assembly of a pre-drilled member set that includes a rod defining a traction mandrel, a first bushing, and a second deformation brushing. The second deformation bushing is capable of deformation on an inaccessible side of the set of pre-drilled members between the head of the mandrel rod and the end portion of the first bushing. The first bushing is capable of bearing on the accessible side surface of the set of pre-drilled members to be assembled, and is capable of radial deformation so as to come in close contact with the drilling profile of at least one pre-drilled member when, upon assembly, the portion of the mandrel rod initially in the second bushing enters the first bushing.

17 Claims, 3 Drawing Sheets

(56) References Cited

U.S. PATENT DOCUMENTS

Figure 1:
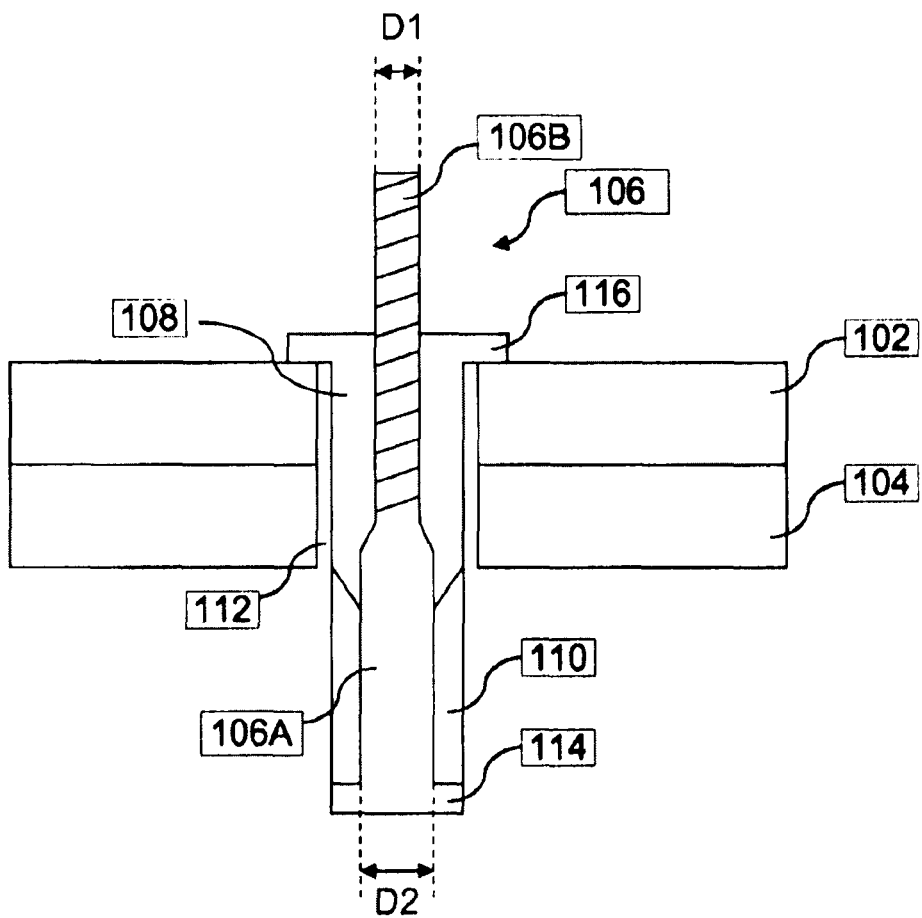

| | | |
|---|---|---|
| 4,639,174 A | 1/1987 | Denham et al. |
| 5,141,373 A * | 8/1992 | Kendall .................... 411/43 |
| 5,599,147 A | 2/1997 | Luhm |
| 5,816,761 A * | 10/1998 | Cassatt et al. .................... 411/34 |
| 5,947,667 A * | 9/1999 | Cassatt et al. .................... 411/34 |
| 6,077,009 A | 6/2000 | Hazelman |
| 7,150,594 B2 * | 12/2006 | Keener .................... 411/34 |
| 2002/0106256 A1 * | 8/2002 | Kaibach et al. ............. 411/60.1 |
| 2003/0123947 A1 * | 7/2003 | Eshraghi .................... 411/43 |
| 2004/0022596 A1 * | 2/2004 | Belanger .................... 411/34 |

\* cited by examiner

DEVICE FOR BLIND FIXATION

This invention relates to an expansive-sleeve screw device for blind fastening.

Blind fastenings currently are used, particularly in aeronautics, to assemble elements when having access to only one side of the assembly, as a result of the impossibility of installation of a standard system, for example screw and nut.

Blind fastenings also are in high demand in industry because they are particularly well suited to automatic installation, for example by robots.

In this description, the adopted term "accessible" side designates the easily accessed side for assembly of the elements and the term "inaccessible" side designates the opposite side, at the back of this assembly of the elements to be permanently fastened to each other. In this field, it is common to use installation tools of the so-called rivet-type fastening devices, these tools being traction devices of the pneumatic or electric gun type. These installation tools are dual-action, making it possible to achieve a juxtaposition of the elements to be assembled and deformation of the zone on the inaccessible side.

The fastening device is made up of a stem forming a traction mandrel, a first sleeve going through the bores for the elements to be permanently assembled, a second deformable sleeve continuous with the first and whose expansion by traction of the mandrel stem projects on the opposite face, on the inaccessible side, to position the elements to be assembled against each other, controlled in their movement and expansion by the traction of the mandrel stem the head of which rests on the deformable sleeve.

Moreover, a lock bushing is inserted into a bore of the first sleeve, on the accessible side, is deformed in the space contained in this said bore and the mandrel stem and retains the assembly of the assembled fastened elements.

Any excess length of the stem on the exposed side then may be severed.

These blind fastening assemblies tend to loosen and come out of their position under the effect of structural vibration, which results in a reduction their useful life, through fatigue, and destruction of the impervious engagement of the head and the countersunk bore, so that corrosive fluid may have access to the interface and corrode the connection.

Likewise, these blind fastening assemblies generally are not applicable to installations in original form, for applications involving shearing stresses which use thin panels, because the necessary head heights lead to countersunk grooves that are similar to the situation of a knife blade, which reduces the shearing support area resulting in a weakening of the fatigue strength and a loosening of the fastening mechanism.

One of the objectives of this invention is to provide the fastening with an excellent resistance to corrosion and a high shear strength by means of mechanical interferences between the fastening and the parts to be assembled.

A blind rivet system which is set up by pulling on the inner stem is described in the standard NAS1919. In this system, the stem comes into interference with the outer sleeve which "inflates." This system, however, is associated with blind pulling fastenings that have:
- a lower performance level, in particular in terms of pretension and fatigue, and
- more scattered real mechanical strength values, which cannot be accepted for structural applications.

There also is a type of blind screw fastening that makes it possible to generate interference in composite: the RADIAL-LOK®. This system however, is complex, costly and heavy, as a result of the minimum seven parts to be used.

Four documents in which a single part is deformed are known:
U.S. Pat. No. 4,967,463, part 54, 56, 58, on FIGS. 1 and 2, 178 or 278 on FIGS. 3 to 6,
U.S. Pat. No. 4,089,249, part 12 bearing on the parts to be assembled (25a, 25b),
U.S. Pat. No. 5,599,147, part 24 bearing on the parts to be assembled (18, 20) and
FR 2 173 559, part 50 bearing on the parts to be assembled (54, 56).

This invention is intended to remedy these drawbacks.

To this end, according to a first aspect, this invention applies to a blind fastening device for fastening the assembly of a set of predrilled elements, comprising a stem forming a traction mandrel, a first sleeve and a second deformation sleeve, able to be slipped with slight play onto the said mandrel stem, in which:
- the mandrel stem comprises a head on the inaccessible side of the set of predrilled elements, on which the said second deformation sleeve may rest,
- the second deformation sleeve is able to deform on the inaccessible side of the set of predrilled elements, between the head of the mandrel stem and the end part of the said first sleeve,
- the said first sleeve is able to come to bear on the accessible-side face of the set of predrilled elements to be assembled, characterized in that:
- the first sleeve is able to deform radially until conforming in shape to the contour of the drilling of at least one predrilled element and
- prior to installation, the mandrel stem has, in the second sleeve, a mean diameter greater than the mean inside diameter of the first sleeve, the first sleeve deforming radially when, during installation, the part of the mandrel stem initially in the second sleeve penetrates into the first sleeve.

Thus, unlike the state of the art, in the embodiments of this invention, two deformation parts are provided, one (second sleeve) forming support on the inaccessible face of the set of parts to be assembled and the other (first sleeve) deforming in the drilling of the parts to be assembled under the effect of sliding of a part of the mandrel stem of larger diameter than the part initially in the first sleeve.

These arrangements make it possible to have different coefficients of deformation, on two sleeves that cooperate with the mandrel stem, to carry out two complementary mechanical actions and that may depend on the assembly to be produced.

By virtue of these arrangements, during installation the thread of the mandrel stem is used in order to cause the part of the mandrel stem having a greater diameter to penetrate into the first sleeve and bring about radial expansion thereof until the outer surface of the first sleeve conforms in shape to the drilling of at least one of the elements to be assembled and, preferentially, to each of these elements.

This invention thus combines the advantages of use of an inner stem that generates an expansion of the first sleeve without friction with the elements to be assembled and those of the blind fastenings to be screwed. It is recalled here that the blind fastenings to be screwed offer the following advantages as compared with the blind fastenings to be pulled:

severing of the installation stem by rotation allows a better control of performance, that is to say a lesser scattering, particularly in pre-tension (axial stress generated during assembly);

better static performance and performance in terms of fatigue on the assembly;

a better performance in the composite and in the thin plates, in pulling ("pull through," "lap-joint");

a better control of the zone and the "facies" for severing of the stem.

The device that is the object of this invention ensures sufficient mechanical strength of the assemblies and, in particular, a good pre-tension. It generates an acceptable interference level. In fact, the fatigue strength of the assemblies is improved with the interference installation. Finally, the device that is the object of this invention is a fastening of simple design, light in weight, inexpensive and easy to install.

The device that is the object of this invention in particular meets the current need to generate interference in the composite assemblies without damaging by delamination.

It is seen that, while this invention is particularly suited to applications in the fastening of composite materials, its use is not limited thereto but also applies, for example, to metal or even hybrid metal/composite assembly.

According to specific characteristics, the mandrel stem comprises a part with more or less constant diameter, mainly in the second sleeve before installation, the length of which is more or less equal to the length of the first sleeve with the exception of its head.

In this way, at the end of installation by screwing on the threaded part of the stem, the entire first sleeve has undergone a radial expansion and has conformed to the inner shape, or contour, of the bores in the elements.

According to specific characteristics, the end part of the first sleeve is cut to conical shape and the end part of the second sleeve in contact with the first sleeve is conical in complementary manner.

In this way, deformation of the second sleeve is facilitated and improved.

According to specific characteristics, the end part of the first sleeve is adapted for protruding from the drill hole of the elements, on the inaccessible side. In this way a stop is formed in order to limit the deformation of the second sleeve so as to prevent crushing thereof and thus reduction of its mechanical performance.

According to specific characteristics, the second sleeve is provided with a slightly tapered end accommodated by the complementary-shaped head of the mandrel stem and the re-entrant angle of which makes it possible to take charge of the axial centering of the second sleeve.

Several types of head are conceivable, for example countersunk, cambered or hexagonal.

According to specific characteristics, the first and the second sleeves together form a sleeve in one piece.

According to a second aspect, this invention applies to an aircraft comprising a blind fastening device such as briefly set forth above.

According to a third aspect, this invention applies to a blind fastening method for fastening of the assembly of a set of predrilled elements, using a stem forming a traction mandrel, a first sleeve and a second deformation sleeve, able to be slipped with slight play onto the said mandrel stem, in which:

the mandrel stem comprises a head on the inaccessible side of the set of predrilled elements, on which the second deformation sleeve may rest, the mandrel stem having, before installation, in the second sleeve, a mean diameter greater than the mean inside diameter of the first sleeve, characterized in that it comprises:

a step of positioning of the first sleeve bearing on the accessible-side face of the set of predrilled elements to be assembled, a step of penetration of a part of the mandrel stem into the first sleeve, a step of radial deformation of the first sleeve until conforming in shape to the contour of the drilling of at least one predrilled element and a step of deformation of the second sleeve on the inaccessible side of the set of predrilled elements, between the head of the mandrel stem and the end part of the said first sleeve.

Since the advantages, objectives and characteristics of this aircraft and of this method are similar to those of the device that is the object of this invention, they are not repeated here.

Figure 2:
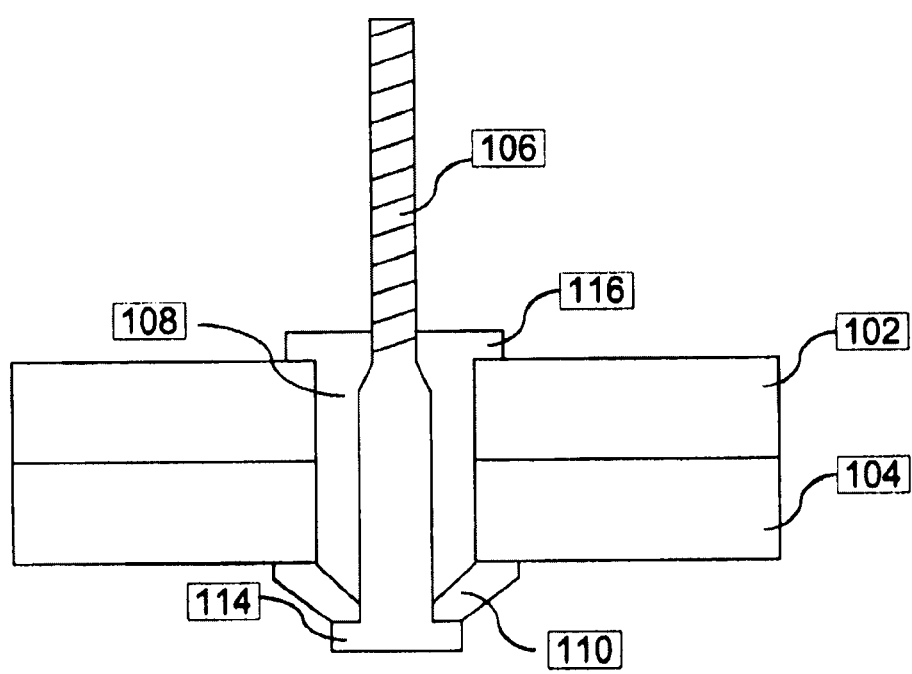
Figure 3:
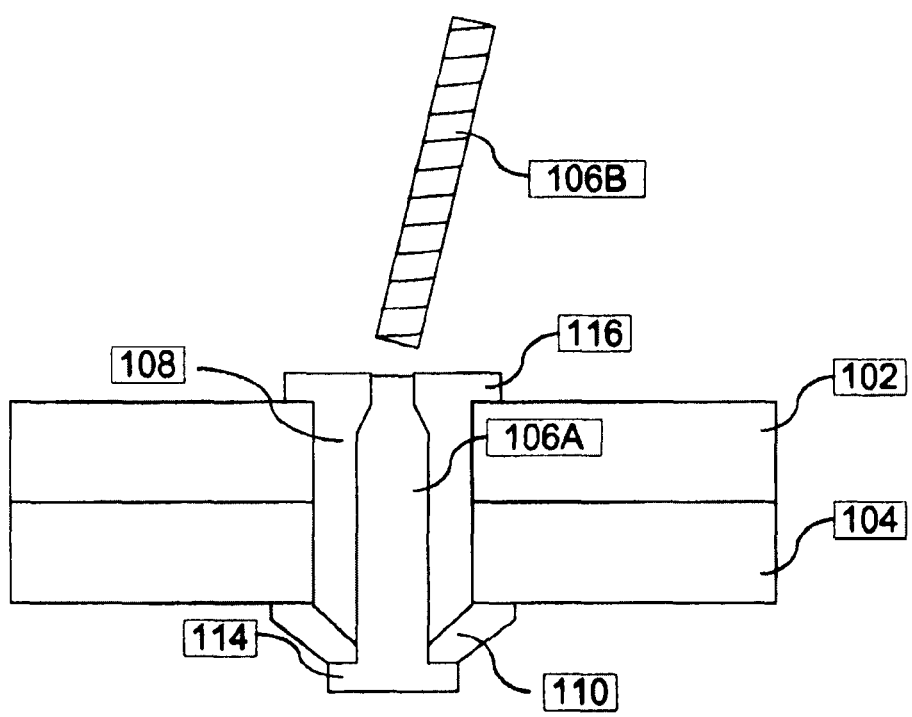

Other advantages, objectives and characteristics of this invention will become apparent from the description that is going to follow, presented with an explanatory and in no way limitative intent with reference to the attached drawings, in which:

FIG. 1 shows, schematically and in section, a specific embodiment of the fastening device that is the object of this invention, at the start of installation thereof, FIG. 2 shows, schematically and in section, the fastening device illustrated on FIG. 1, during installation and FIG. 3 shows, schematically and in section, the fastening device illustrated on FIG. 1, at the end of installation.

The fastening device illustrated in the Figures consists of a stem 106 ("stem") forming a mandrel, and, slipped thereon successively starting from the accessible side, a first sleeve 108 ("sleeve") going into the bores of elements 102 to 104 to be permanently assembled, a second deformable sleeve 110. Second sleeve 110, of the same diameter as first sleeve 108, is continuous with the first sleeve 108 and projects on the opposite face of element 104, on the inaccessible side.

The expansion of second sleeve 110, under the effect of traction of mandrel stem 106 toward the accessible side projects onto the face of element 104, on the inaccessible side, with the effect of positioning elements 102 and 104 against one another and making them integral.

First sleeve 108 is able to deform radially to conform in shape to the bores of elements 102 and 104. The first and second sleeves are controlled in their movement and expansion by the traction of mandrel stem 106 the head of which 114 rests on second sleeve 110.

Zone 116 projecting peripherally in the form of a washer from first sleeve 108, or "head" 116, is intended to come to bear on the face of a complementary groove on the accessible side of front element 102. Elements to be assembled 102 and 104 are predrilled with the same drill-hole diameter.

First sleeve 108 is intended to accommodate, bearing on its rear conical end face, second sleeve 110, which is accommodated via its front end in the drilling of rear element 104. Second sleeve 110 also rests on head 114 of stem 106, in order, under the traction stress of the installation device (not shown), to deform in two strokes on the inaccessible side of elements 102 and 104 to be assembled (FIG. 2).

This brings about a pressing together of elements 102 and 104 to be assembled.

Preferentially, head 114 of stem 106 is, on the side bearing on second sleeve 110, at re-entrant angles and the end of second sleeve 110 is complementary, that is to say slightly tapered (in conical shape), which contributes to centering sleeve 110 with the traction of stem 106.

For each of heads 114 and 116, several types of head are conceivable, for example countersunk, cambered or hexagonal.

In accordance with this invention, stem 106 has several cylindrical parts of different diameters. Cylindrical part 106A of stem 106, which before traction on stem 106 is in second sleeve 110, has a diameter D2 (FIG. 1) greater:
than mean diameter D1 of threaded part 106B of stem 106 which initially is in first sleeve 108 and
than the inside diameter of first sleeve 108.

In this way, zone 106A of stem 106 has the effect, during its passage into first sleeve 108, of bringing about, through arching, expansion of the inside diameter of sleeve 108, thus resulting in tightening thereof through take-up of slight play 112 of first sleeve 108 in the bores of elements 102 and 104.

Preferentially, a hairline crack (not shown) of stem 106 at the end of traction is provided on its threaded part.

The length of stem 106 is selected so that it allows the pressing together of elements 102 and 104, during traction of stem 106 under the action of the installation tool (not shown). The length of part 106A, with large diameter, is more or less equal to the length of first sleeve 108 with the exception of its head 116, so that at the end of installation by screwing on threaded part 106B of stem 106, the entire first sleeve 108 has undergone a radial expansion and has conformed to the inner shape, or contour, of the bores in elements 102 and 104.

The length of first sleeve 108 is adapted so that its end part protrudes from the drill-hole of the elements, on the inaccessible side. It thus constitutes a stop to limit the deformation of second sleeve 110 so as to prevent crushing thereof and therefore reduction of its mechanical performance.

The use of the blind fastening device according to the invention now is described. It is simple and follows from the foregoing description. It is a matter of successively slipping sleeves 108 and 110 onto stem 106 and slipping the whole into the drilling of aligned elements 102 and 104 (FIG. 1). Then, with the aid of the installation tool, a traction may be implemented on stem 106, using the threading of part 106B of stem 106 (FIG. 2).

Second sleeve 110 rests on sleeve 108 and on head 114 of stem 106. A regular peripheral bead at the drilling end of element 104 is created by deformation of second sleeve 110. This allows the set of elements 102 and 104 to be retightened following a precise pressing together.

Zone 106A of stem 106, during its passage into first sleeve 108, brings about expansion of the diameter of first sleeve 108 until it conforms in shape to the contour of the bores of elements 102 and 104 (FIG. 2).

For this purpose, stem 106 is coated with a lubricant facilitating the sliding of part 106A into first sleeve 108 during deformation of first sleeve 108. This lubricant is, for example, deposited in powder form and activated during use by mechanical action that allows its pressing together on the zones to be deformed.

As illustrated on FIG. 3, when head 114 of stem 106 reaches the end of the first sleeve, stem 106 breaks at its hairline crack and the fastening of elements 102 and 104 is achieved, the expansion of first sleeve 108 generating interference in the assembly.

It is noted that this invention may apply in particular to metal structures as well as to composite structures and to hybrid metal/composite assembly. In particular, it especially meets the current need to generate interference in composite assemblies without damaging by delamination.

Several types of materials and protections are conceivable for construction thereof according to the applications considered.

For example, the following materials may be used:
concerning stem 106: titanium, steel or inconel,
concerning the possible bushing: stainless steel or titanium and
concerning the protection and/or lubrication: passivation, sulfuric anodizing, pure aluminum deposited under vacuum, resins . . . etc.

It is to be noted that the imperviousness of the assembly of elements 102 and 104 may be completed, for example, by disposing a toroidal ring (not shown) between first sleeve 108 and stem 106 and an outer peripheral joint in an outer groove of first sleeve 108 bearing imperviously against the drill-hole of element 102.

Although, in the above description, in an explanatory intent, first and second sleeves 108 and 110 have been described as separate elements, the first and second sleeves preferentially together form a sleeve in one piece.

It is noted that the implementation of this invention makes it possible to have different coefficients of deformation, on two sleeves that cooperate with the mandrel stem, in order to carry out two complementary mechanical actions. The different coefficient of deformation may depend on the assembly to be produced.

For the implementation of the method that is the object of this invention, there are performed:
a step of positioning of the first sleeve bearing on the accessible-side face of the set of predrilled elements to be assembled,
a step of penetration of a part of the mandrel stem into the first sleeve,
a step of radial deformation of the first sleeve until conforming in shape to the contour of the drilling of at least one predrilled element and
a step of deformation of the second sleeve on the inaccessible side of the set of predrilled elements, between the head of the mandrel stem and the end part of the said first sleeve.

The invention claimed is:

1. A blind fastening device for fastening an assembly of a set of predrilled elements, comprising:
a mandrel stem including a threaded part forming a traction mandrel;
a first sleeve and a second deformation sleeve, configured to be slipped with slight play onto the mandrel stem;
wherein the mandrel stem comprises a head on an inaccessible side of the set of predrilled elements, on which the second deformation sleeve rests prior and during installation,
wherein the second deformation sleeve is configured to deform on the inaccessible side of the set of predrilled elements, between the head of the mandrel stem and an end part of the first sleeve,
wherein the first sleeve is configured to come to bear on an accessible-side face of the set of predrilled elements to be assembled,
wherein the first sleeve is configured to deform radially until conforming in shape to a contour of a drill hole of at least one predrilled element of the set of predrilled elements, and
wherein prior to installation, the mandrel stem has, in the second sleeve, a mean diameter greater than a mean inside diameter of the first sleeve, the first sleeve deforming radially when, during installation, the part of the mandrel stem initially in the second sleeve penetrates into the first sleeve.

2. The blind fastening device according to claim 1, wherein the mandrel stem comprises a part with more or less constant diameter, mainly in the second sleeve before installation, a length of which is more or less equal to a length of the first sleeve with exception of its head.

3. The blind fastening device according to claim 1, wherein the end part of the first sleeve is cut to a conical shape and an end part of the second sleeve in contact with the first sleeve is conical in a complementary manner.

4. The blind fastening device according to claim 1, wherein the end part of the first sleeve is configured to protrude from the drill hole of the at least one predrilled element, on the inaccessible side.

5. The blind fastening device according to claim 1, wherein the second sleeve includes a tapered end accommodated by a complementary-shaped head of the mandrel stem and a re-entrant angle of which makes it possible to take charge of axial centering of the second sleeve.

6. The blind fastening device according to claim 1, wherein the first sleeve and the second deformation sleeve together form a sleeve in one piece.

7. An aircraft comprising the blind fastening device according to claim 1.

8. The blind fastening device according to claim 1, wherein an end of the threaded part is provided with a hairline crack.

9. A blind fastening method for fastening an assembly of a set of predrilled elements, by using a mandrel stem including a threaded part forming a traction mandrel, a first sleeve, and a second deformation sleeve, configured to be slipped with slight play onto the mandrel stem, wherein the mandrel stem includes a head on an inaccessible side of the set of predrilled elements, on which the second deformation sleeve may rest, and prior to installation, the mandrel stem having, in the second sleeve, a mean diameter greater than a mean inside diameter of the first sleeve, the method comprising:
positioning the first sleeve bearing on an accessible-side face of the set of predrilled elements to be assembled;
penetrating a part of the mandrel stem into the first sleeve via screwing of the threaded part;
radial deforming the first sleeve until the first sleeve conforms in shape to a contour of a drill hole of at least one predrilled element of the set of predrilled elements; and
deforming the second sleeve on the inaccessible side of the set of predrilled elements, between the head of the mandrel stem and an end part of the first sleeve.

10. A blind fastening device for fastening an assembly of a set of predrilled elements, comprising:
a mandrel stem forming a traction mandrel;
a first sleeve and a second deformation sleeve, configured to be slipped with slight play onto the mandrel stem, the first sleeve and the second deformation sleeve being one piece;
wherein the mandrel stem comprises a head on an inaccessible side of the set of predrilled elements, on which the second deformation sleeve may rest,
wherein the second deformation sleeve is configured to deform on the inaccessible side of the set of predrilled elements, between the head of the mandrel stem and an end part of the first sleeve,
wherein the first sleeve is configured to come to bear on an accessible-side face of the set of predrilled elements to be assembled,
wherein the first sleeve is configured to deform radially until conforming in shape to a contour of a drill hole of at least one predrilled element of the set of predrilled elements, and
wherein prior to installation, the mandrel stem has, in the second sleeve, a mean diameter greater than a mean inside diameter of the first sleeve, the first sleeve deforming radially when, during installation, the part of the mandrel stem initially in the second sleeve penetrates into the first sleeve.

11. The blind fastening device according to claim 10, wherein the mandrel stem comprises a part with more or less constant diameter, mainly in the second sleeve before installation, a length of which is more or less equal to a length of the first sleeve with exception of its head.

12. The blind fastening device according to claim 10, wherein the end part of the first sleeve is cut to a conical shape and an end part of the second sleeve in contact with the first sleeve is conical in a complementary manner.

13. The blind fastening device according to claim 10, wherein the end part of the first sleeve is configured to protrude from the drill hole of the at least one predrilled element, on the inaccessible side.

14. The blind fastening device according to claim 10, wherein the second sleeve includes a tapered end accommodated by a complementary-shaped head of the mandrel stem and a re-entrant angle of which makes it possible to take charge of axial centering of the second sleeve.

15. The blind fastening device according to claim 10, wherein the first sleeve and the second deformation sleeve together form a sleeve in one piece.

16. An aircraft comprising the blind fastening device according to claim 10.

17. The blind fastening device according to claim 10, wherein an end of the mandrel stem is provided with a hairline crack.

* * * * *